(12) United States Patent
Kawahara (10) Patent No.: US 11,813,948 B2
(45) Date of Patent: Nov. 14, 2023

(54) VEHICLE AND VEHICLE CONTROL METHOD INCLUDING CONTROLLING CHARGING AND DISCHARGING FOR PROTECTING A POWER LINE

(71) Applicant: TOYOTA JIDOSHA KABUSHIKI KAISHA, Toyota (JP)

(72) Inventor: Hisato Kawahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 17/375,245

(22) Filed: Jul. 14, 2021

(65) Prior Publication Data
US 2022/0016993 A1    Jan. 20, 2022

(30) Foreign Application Priority Data
Jul. 17, 2020  (JP) .................................. 2020-122882

(51) Int. Cl.
*B60L 53/14*        (2019.01)
*B60L 53/62*        (2019.01)
(Continued)

(52) U.S. Cl.
CPC .............. *B60L 53/14* (2019.02); *B60L 53/20* (2019.02); *B60L 53/62* (2019.02); *B60L 55/00* (2019.02);
(Continued)

(58) Field of Classification Search
CPC .......... B60L 53/62; B60L 53/14; B60L 53/20; B60L 55/00; B60L 2240/36;
(Continued)

(56) References Cited

U.S. PATENT DOCUMENTS

| 8,907,631 | B1 * | 12/2014 | Gurries | ................. | G01K 13/00 |
| | | | | | 320/141 |
| 2001/0015636 | A1 * | 8/2001 | Yagi | ....................... | B60L 58/16 |
| | | | | | 320/132 |

(Continued)

FOREIGN PATENT DOCUMENTS

| DE | 102019121396 A1 * | 3/2020 | |
| EP | 3021098 B1 * | 1/2018 | ................ B60L 3/04 |

(Continued)

*Primary Examiner* — Richard Isla
*Assistant Examiner* — Manuel Hernandez
(74) *Attorney, Agent, or Firm* — Oliff PLC (57) ABSTRACT

A vehicle includes a power interface configured to perform at least one of power transmission to and power reception from an external apparatus, a power accumulation device, a power line that constitutes at least a part of a current path between the power interface and the power accumulation device, and a control device configured to control charging and discharging of the power accumulation device using a plurality of profiles for protecting the power line. The profiles are determined such that the degrees of reduction of the magnitude of a current that flows through the power line and the energization time become larger as the ambient temperature of the power line becomes higher. The profiles include a first profile and a second profile that has a larger degree of reduction than that of the first profile.

8 Claims, 7 Drawing Sheets

(51) Int. Cl.
  *H02J 7/00* (2006.01)
  *B60L 55/00* (2019.01)
  *B60L 53/20* (2019.01)
(52) U.S. Cl.
  CPC ........ *H02J 7/0071* (2020.01); *H02J 7/00309* (2020.01); *H02J 7/007192* (2020.01); *B60L 2240/36* (2013.01); *H02J 2207/10* (2020.01)
(58) Field of Classification Search
  CPC ................. H02J 7/00309; H02J 7/0071; H02J 7/007192; H02J 2207/10
  USPC .................................................. 320/109, 150
  See application file for complete search history.

(56) References Cited

U.S. PATENT DOCUMENTS

| | | | | |
|---|---|---|---|---|
| 2008/0284379 | A1* | 11/2008 | Hirano | H02J 7/0047 320/150 |
| 2012/0212179 | A1* | 8/2012 | Nathan | B60L 53/16 320/109 |
| 2016/0028249 | A1* | 1/2016 | Tokutake | H02J 7/007192 320/152 |
| 2016/0167535 | A1* | 6/2016 | Lopez | B60L 58/24 320/157 |
| 2017/0085098 | A1* | 3/2017 | Sporck | H02J 7/00 |
| 2017/0334300 | A1* | 11/2017 | Huang | H02J 7/007 |
| 2023/0095211 | A1* | 3/2023 | Kamikihara | B60L 53/302 320/109 |

FOREIGN PATENT DOCUMENTS

| | | | | |
|---|---|---|---|---|
| JP | H09-294305 | A | 11/1997 | |
| JP | 2012-060778 | A | 3/2012 | |
| JP | 2012-244789 | A | 12/2012 | |
| JP | 2016-082772 | A | 5/2016 | |
| WO | WO-2021032293 | A1 * | 2/2021 | ............ B60L 3/0046 |

* cited by examiner

VEHICLE AND VEHICLE CONTROL METHOD INCLUDING CONTROLLING CHARGING AND DISCHARGING FOR PROTECTING A POWER LINE

CROSS-REFERENCE TO RELATED APPLICATION

This application claims priority to Japanese Patent Application No. 2020-122882 filed on Jul. 17, 2020, incorporated herein by reference in its entirety.

BACKGROUND

1. Technical Field

The present disclosure relates to a vehicle and a vehicle control method, and more particularly to a vehicle control technique configured to perform at least one of power transmission to and power reception from an external apparatus.

2. Description of Related Art

In recent years, vehicles that can be charged with power supplied from an external apparatus via a charging cable have been spread. This type of charging is called "external charging". The vehicles that can be charged externally include plug-in hybrid vehicles, electric vehicles, etc. In general, these vehicles are provided with an inlet for connection with a charging cable (more particularly, a charging connector provided at the distal end of the charging cable). In many cases, the above vehicles can supply power to an external apparatus via a charging cable, in an emergency such as a disaster or for the purpose of leveling power demand.

Japanese Unexamined Patent Application Publication No. 2016-82772 (JP 2016-82772 A) discloses a charger. This charger includes a temperature detection unit that detects the temperature of an internal part of the charger, and a control unit that controls a current to be output to a power accumulation device in accordance with a current command value transmitted from the power accumulation device. When the temperature of the internal part is equal to or more than a first threshold, the control unit transmits, to the power accumulation device, a reduced value of a current that can be output from the charger in order to reduce the current command value. When the temperature of the internal part is equal to or less than a second threshold which is smaller than the first threshold, meanwhile, the control unit transmits, to the power accumulation device, an increased value of a current that can be output from the charger in order to increase the current command value.

SUMMARY

In the vehicles described above, in general, at least a part of a current path between the inlet and a battery is electrically connected by a power line. When a large current flows through the power line as the battery is charged and discharged, the temperature of the power line may be raised. Therefore, it is desirable to reduce charging and discharging of the battery so that the temperature of the power line is not excessively raised. On the other hand, when too much focus is placed on the protection of the power line, or in other words when charging and discharging of the battery is reduced excessively, it may take a long time to charge and discharge the battery.

The present disclosure has been made to address such an issue, and allows appropriate protection of a power line while preventing the time required to charge and discharge a battery from becoming excessively long.

A first aspect of the present disclosure provides a vehicle including: a power interface configured to perform at least one of power transmission to and power reception from an external apparatus; a power accumulation device; a power line that constitutes at least a part of a current path between the power interface and the power accumulation device; and a control device configured to control charging and discharging of the power accumulation device using a plurality of profiles for protecting the power line. The profiles are determined such that degrees of reduction of a magnitude of a current that flows through the power line and an energization time become larger as an ambient temperature of the power line becomes higher. The profiles include a first profile and a second profile that has a degree of reduction larger than a degree of reduction of the first profile. The control device calculates, before charging and discharging of the power accumulation device, an elapsed time since last charging and discharging of the power accumulation device. The control device is configured to control charging and discharging of the power accumulation device using one of the first and second profiles that matches the ambient temperature when the elapsed time is longer than a reference time, and control charging and discharging of the power accumulation device using the second profile, irrespective of the ambient temperature, when the elapsed time is shorter than the reference time.

In the aspect described above, the second profile having a larger degree of reduction of the current and the energization time is used, irrespective of the ambient temperature, when the elapsed time since the last charging and discharging of the power accumulation device is shorter than the reference time (in other words, when the power accumulation device is charged and discharged repeatedly at relatively short intervals). The power line can be protected more reliably, even if there is an error between the ambient temperature and the actual temperature of the power line, by using the second profile which is set to be safer. Thus, with the configuration described above, the power line can be protected appropriately while preventing the time required to charge and discharge the power accumulation device from becoming excessively long.

In the aspect described above, the second profile may have the degree of reduction that is the largest among the degrees of reduction of the profiles.

In the aspect described above, a temperature sensor configured to detect a temperature of the power line may not be provided. The power line may be disposed in a compartment. The vehicle may further include a temperature sensor configured to detect a temperature in the compartment as the ambient temperature.

In the aspect described above, the vehicle may further include a power conversion device that performs power conversion operation between the power interface and the power accumulation device. The power conversion device may be disposed in the same compartment as the power line. The temperature sensor may be configured to detect an environmental temperature of the power conversion device as the ambient temperature.

In the aspect described above, the vehicle may further include a power drive device disposed in the compartment to control travel of the vehicle. The control device may be configured to estimate the ambient temperature based on a travel history of the vehicle.

The control device may be configured to calculate the elapsed time based on at least one of a time that has elapsed since last external charging of the power accumulation device and a time that has elapsed since travel of the vehicle was finished.

The control device may be configured to calculate the elapsed time based on at least one of a time that has elapsed since last external power supply from the power accumulation device and a time that has elapsed since travel of the vehicle was finished.

A second aspect of the present disclosure provides a control method for a vehicle, the vehicle including a power interface configured to perform at least one of power transmission to and power reception from an external apparatus, a power accumulation device, and a power line that constitutes at least a part of a current path between the power interface and the power accumulation device. The control method includes: acquiring an ambient temperature of the power line; and controlling charging and discharging of the power accumulation device using a plurality of profiles for protecting the power line. The profiles are determined such that degrees of reduction of a magnitude of a current that flows through the power line and an energization time become larger as an ambient temperature of the power line becomes higher. The profiles include a first profile and a second profile that has a degree of reduction larger than a degree of reduction of the first profile. The controlling includes calculating, before charging and discharging of the power accumulation device, an elapsed time since last charging and discharging of the power accumulation device, controlling charging and discharging of the power accumulation device using one of the first and second profiles that matches the ambient temperature when the elapsed time is longer than a reference time, and controlling charging and discharging of the power accumulation device using the second profile, irrespective of the ambient temperature, when the elapsed time is shorter than the reference time.

With the aspect described above, the power line can be protected appropriately while preventing the time required to charge and discharge the power accumulation device from becoming excessively long.

With the present disclosure, the power line can be protected appropriately while preventing the time required to charge and discharge the power accumulation device from becoming excessively long.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments will be described in detail below with reference to the drawings. Like and equivalent portions are given like signs in the drawings to omit repeated description.

First Embodiment

A configuration in which a vehicle according to the present disclosure is supplied with power (externally charged) will be described in relation to a first embodiment.

System Configuration

Figure 1:
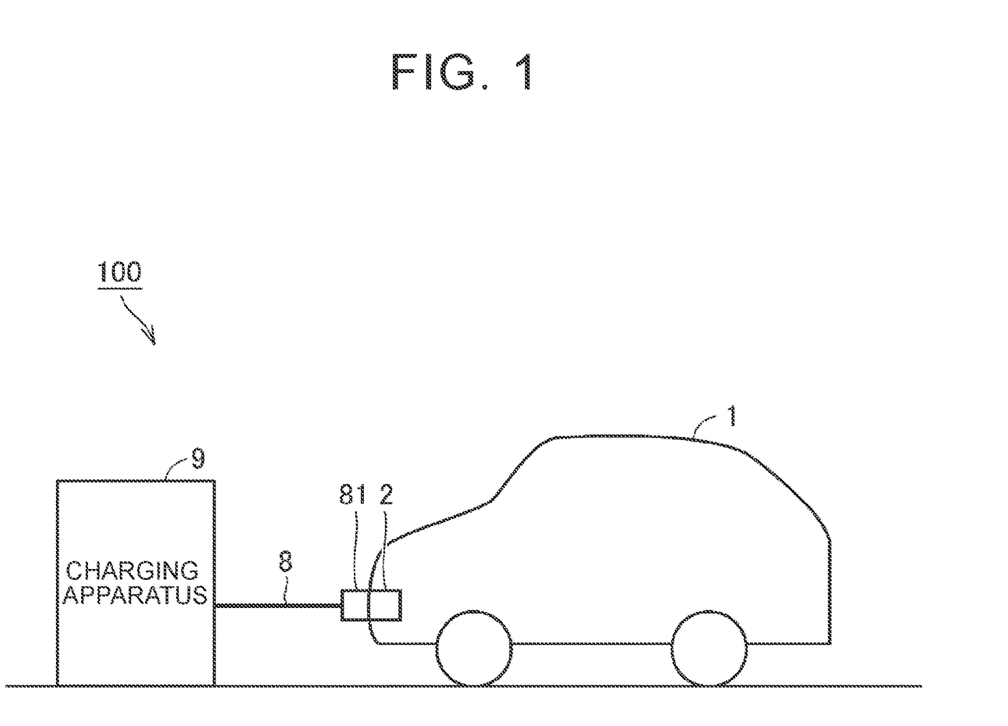
FIG. 1 schematically illustrates an overall configuration of a charging system, including a vehicle, according to an embodiment of the present disclosure.

FIG. 1 schematically illustrates an overall configuration of a charging system, including a vehicle, according to an embodiment of the present disclosure. With reference to FIG. 1, a charging system 100 includes a vehicle 1, a charging cable 8, and a charging apparatus 9. FIG. 1 illustrates a state in which the vehicle 1 and the charging apparatus 9 are electrically connected to each other through the charging cable 8. In this example, an inlet 2 is provided at a front part of the vehicle 1. Power is supplied from the charging apparatus 9 to the vehicle 1 via the charging cable 8 and the inlet 2 to charge a battery 6 (see FIG. 2) mounted on the vehicle 1.

The vehicle 1 is an electric vehicle, for example. However, the vehicle 1 may be a plug-in hybrid vehicle, a fuel cell vehicle, etc. as long as the vehicle is configured to be externally chargeable. The charging apparatus 9 may be a dedicated charger provided at the home of a user etc., or may be a charger provided at a public charging stand (also called charging station). The charging apparatus 9 is an example of the "external apparatus" according to the present disclosure.

Figure 2:
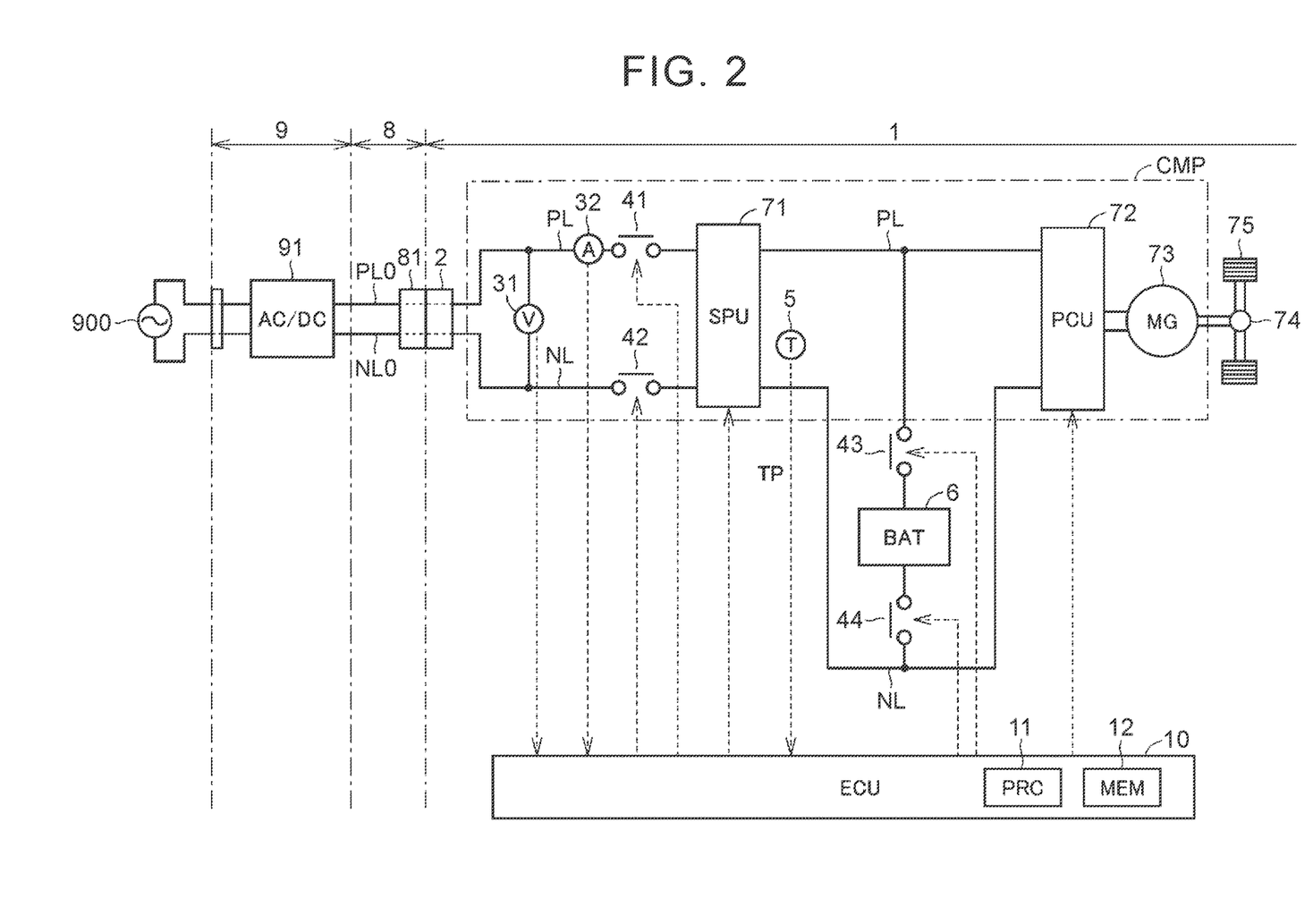
FIG. 2 is a block diagram illustrating the configuration of a charging system in detail.

FIG. 2 is a block diagram illustrating the configuration of the charging system 100 in detail. With reference to FIG. 2, the charging apparatus 9 is a direct-current (DC) charger that supports so-called fast charging in this example. The charging apparatus 9 includes an alternating-current/direct-current (AC/DC) converter 91. The charging cable 8 includes a charging connector 81 and power supply lines PL0, NL0.

The AC/DC converter 91 converts alternating-current (AC) power supplied from an external power system (e.g. system power source) 900 via a power line into DC power for charging the battery 6 (to be discussed later) which is mounted on the vehicle 1. Power conversion performed by the AC/DC converter 91 may be executed as a combination of an AC/DC conversion for power factor improvement and a DC/DC conversion for voltage level adjustment. The DC power which is output from the AC/DC converter 91 is supplied to the vehicle 1 via the power supply lines PL0, NL0 of the charging cable 8.

The charging apparatus 9 which is a fast charger is merely an example. The charging apparatus 9 may be a so-called normal charger that supplies AC power to the vehicle 1. In that case, the charging apparatus 9 adjusts the voltage level of the AC power from the power system 900, and supplies the AC power after the adjustment to the vehicle 1.

The vehicle 1 includes the inlet 2, power lines PL, NL, a voltage sensor 31, a current sensor 32, charging relays 41, 42, system main relays (SMRs) 43, 44, an ambient temperature sensor 5, the battery 6, a power conversion device 71, a power control unit (PCU) 72, a motor/generator 73, a power transfer gear 74, drive wheels 75, and an electronic control unit (ECU) 10.

In the present embodiment, the voltage sensor 31, the current sensor 32, the charging relays 41, 42, the power conversion device 71, the PCU 72, and the motor/generator 73 are disposed in a compartment (indicated as "CMP" in FIG. 2) provided at a front part of the vehicle 1. The ambient temperature sensor 5 and at least a part of the power lines PL, NL are disposed in the same compartment as the devices described above.

The inlet (charging port) 2 is configured to be able to receive insertion of the charging connector 81 which is provided at the distal end of the charging cable 8 with mechanical coupling such as fitting. As the charging connector 81 is inserted, electrical connection between the power supply line PL0 and a contact of the inlet 2 on the positive electrode side is secured, and electrical connection between the power supply line NL0 and a contact of the inlet 2 on the negative electrode side is secured. When the inlet 2 and the charging connector 81 are connected to each other, the ECU 10 of the vehicle 1 and a control device (not illustrated) of the charging apparatus 9 can mutually transmit and receive various commands and data in accordance with a communication standard such as a controller area network (CAN). The inlet 2 is an example of the "power interface" (e.g. an inlet) according to the present disclosure.

The voltage sensor 31 is electrically connected between the power line PL and the power line NL on the side of the inlet 2 with respect to the charging relays 41, 42. The voltage sensor 31 detects a DC voltage between the power line PL and the power line NL, and outputs the detection result to the ECU 10. The current sensor 32 detects a current that flows through the power line PL on the side of the inlet 2 with respect to the charging relays 41, 42, and outputs the detection result to the ECU 10. The ECU 10 can calculate power (power for charging the battery 6) supplied from the charging apparatus 9 to the vehicle 1 based on the detection results from the voltage sensor 31 and the current sensor 32.

The charging relay 41 is electrically connected to the power line PL. The charging relay 42 is electrically connected to the power line NL. The SMR 43 is electrically connected between the power line PL and the positive electrode of the battery 6. The SMR 44 is electrically connected between the power line NL and the negative electrode of the battery 6. When the charging relays 41, 42 are closed in accordance with a command from the ECU 10 and the SMRs 43, 44 are closed, power transfer between the inlet 2 and the battery 6 is enabled.

The ambient temperature sensor 5 is provided in the compartment in which the power lines PL, NL are disposed, as discussed earlier. The ambient temperature sensor 5 detects the temperature in the compartment as an ambient temperature of the power lines PL, NL, and outputs the detection result to the ECU 10. Hereinafter, the ambient temperature is represented as "TP". The ambient temperature TP of the power lines PL, NL is also an environmental temperature of the power conversion device 71 etc.

It is also conceivable to provide a temperature sensor (not illustrated) dedicated to the power lines PL, NL, and suppress a rise in the temperature of the power lines PL, NL by monitoring the temperature of the power lines PL, NL. However, providing a temperature sensor for each of the power lines PL, NL accordingly increases the component cost. Thus, it is desirable to protect the power lines PL, NL using the ambient temperature sensor 5 for monitoring the environmental temperature of the battery 6 (as discussed in detail later) without providing a temperature sensor dedicated to the power lines PL, NL.

The battery 6 is disposed under the floor of the vehicle 1, for example. The battery 6 is an assembled battery that includes a plurality of cells. Each cell is a secondary battery such as a lithium-ion battery or a nickel-metal hydride battery. The battery 6 supplies power for generating a drive force of the vehicle 1. In addition, the battery 6 stores power generated by the motor/generator 73. A capacitor such as an electric double layer capacitor may be adopted in place of the battery 6. The battery 6 or the capacitor is an example of the "power accumulation device" according to the present disclosure.

The battery 6 is provided with a monitoring unit that monitors the state of the battery 6. The monitoring unit is provided with a voltage sensor that detects the voltage of the battery 6, a current sensor that detects a current input to and output from the battery 6, and a temperature sensor that detects the temperature of the battery 6, none of which is illustrated. The ECU 10 can calculate the state of charge (SOC) of the battery 6, for example, based on signals from the sensors.

The power conversion device 71 is electrically connected between the inlet 2 and the battery 6. The power conversion device 71 executes power conversion operation (which may be operation for lowering/raising the voltage of DC power, or may be operation for conversion between DC power and AC power), which is required for the inlet 2 and the battery 6, in accordance with a command from the ECU 10.

The PCU 72 is electrically connected between the battery 6 and the motor/generator 73. The PCU 72 includes a converter and an inverter (neither of which is illustrated), and drives the motor/generator 73 in accordance with a command from the ECU 10.

The motor/generator 73 is an AC rotary electric machine. Examples of the motor/generator 73 include a permanent-magnet synchronous motor which includes a rotor in which permanent magnets are embedded. Output torque of the motor/generator 73 is transferred to the drive wheels 75 through the power transfer gear 74 to cause the vehicle 1 to travel. Meanwhile, the motor/generator 73 can generate power using a rotational force of the drive wheels 75 during braking operation of the vehicle 1. Power generated by the motor/generator 73 is converted by the PCU 72 into power for charging the battery 6.

The ECU 10 includes a processor 11 such as a central processing unit (CPU), a memory 12 such as a read only memory (ROM) and a random access memory (RAM), and input and output ports (not illustrated). The ECU 10 controls devices in accordance with signals from sensors etc. to bring the vehicle 1 into a desired state. The ECU 10 may be constituted from a plurality of separate ECUs for respective functions.

Main control executed by the ECU 10 with the present embodiment includes fast charging in which the battery 6 is charged with large power supplied from the charging apparatus 9 via the charging cable 8. When a current supplied from the charging apparatus 9 flows through the power lines PL, NL, Joule heat is generated, which may cause degradation (including erosion) of the power lines PL, NL to progress. The ECU 10 protects the power lines PL, NL from excessive progress of degradation by selectively using a plurality of charging profiles, as appropriate, during fast charging. Subsequently, the charging profiles will be described.

Charging Profile

Figure 3:
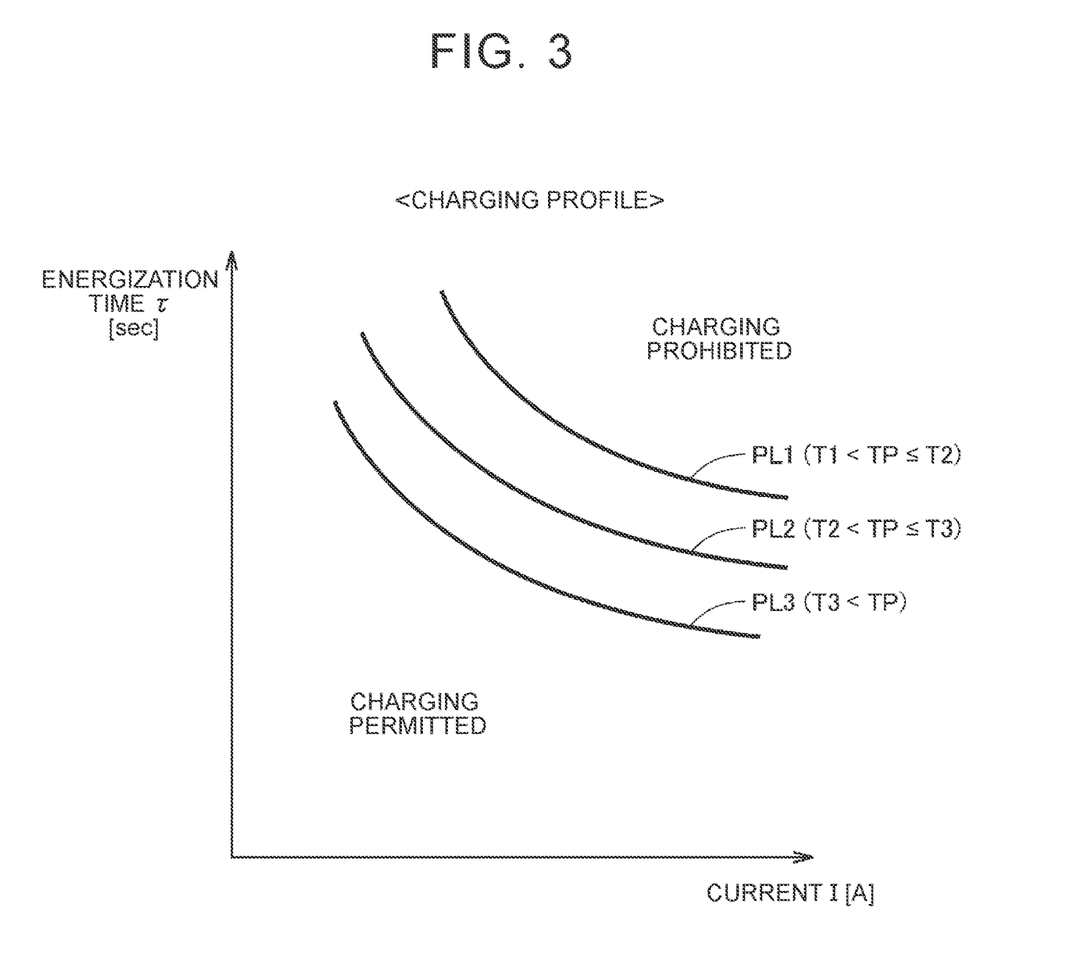
FIG. 3 is a conceptual chart indicating a plurality of charging profiles.
Figure 4:
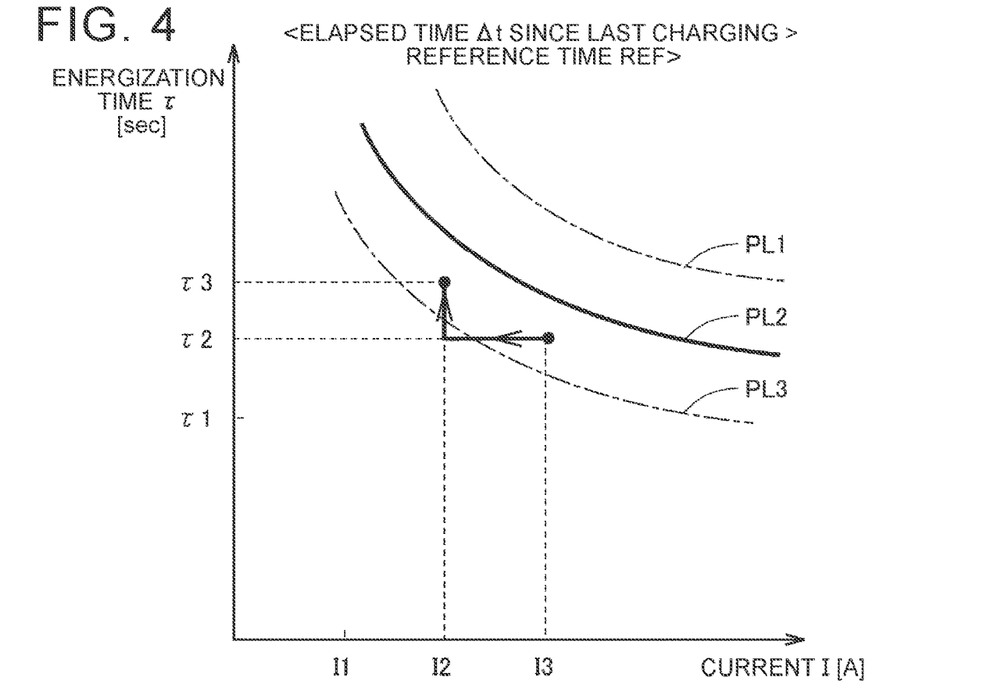
FIG. 4 illustrates a charging profile to be used when the elapsed time since the last charging was finished is longer than a reference time.
Figure 5:
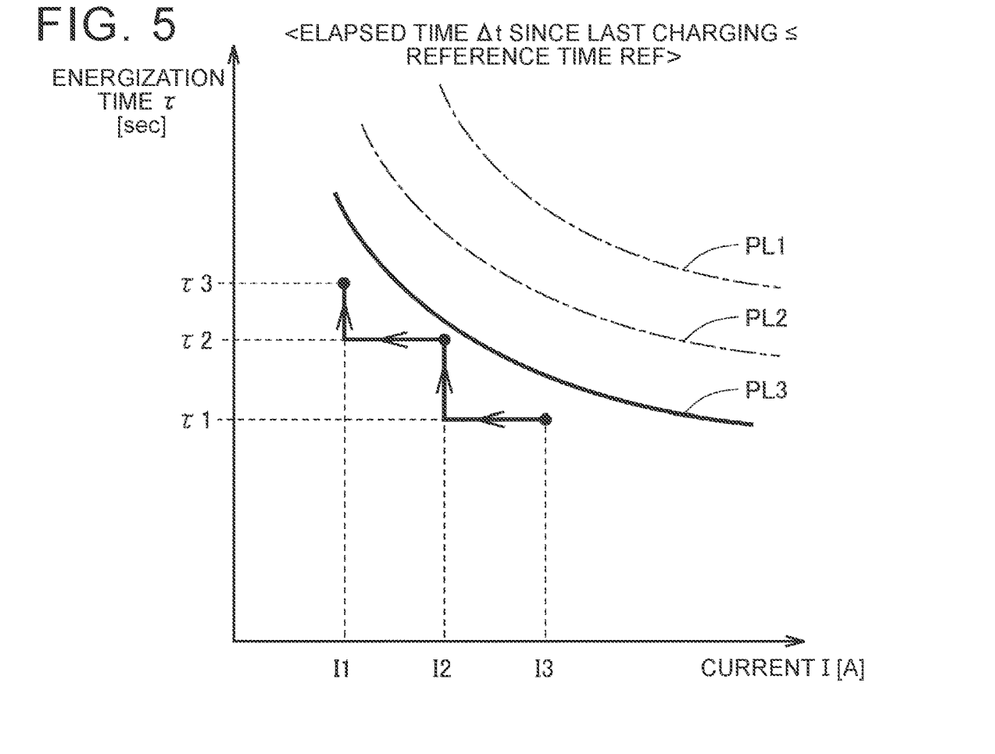
FIG. 5 illustrates a charging profile to be used when the elapsed time since the last charging was finished is equal to or less than the reference time.

FIG. 3 is a conceptual chart indicating the plurality of charging profiles. In FIG. 3 and FIGS. 4 and 5 to be discussed later, the horizontal axis represents an energization current I (a current for charging the battery 6) for the power lines PL, NL. The vertical axis represents an energization time τ (a time for charging the battery 6) for the power lines PL, NL.

The energization time τ for the power lines PL, NL is a time for which the power lines PL, NL are energized continually or continuously. When energization is suspended for a certain time or more, the energization time τ may be reset. Even if energization is suspended, the energization time τ is continuously increased, without being reset, when the suspension period is sufficiently short.

In the following example, with reference to FIG. 3, it is assumed that three threshold temperatures T1 to T3 are set for the ambient temperature TP of the power lines PL, NL. Of T1 to T3, T1 is the lowest, and T3 is the highest. T2 is a temperature between T1 and T3. By way of example, T1=10° C., T2=40° C., and T3=70° C.

In this example, the ECU 10 has three charging profiles PL1 to PL3. Each of the charging profiles PL1 to PL3 is determined based on the specifications (in particular, a wire diameter φ or the cross-sectional area of the power lines PL, NL) of the power lines PL, NL, a current I that flows through the power lines PL, NL, and the energization time τ for the power lines PL, NL. Since the wire diameter φ of the power lines PL, NL is a fixed value, each of the charging profiles PL1 to PL3 is represented by a curve on which the product (which is proportional to the amount of generated Joule heat) of the square of the current I and the energization time τ is constant on a coordinate plane illustrated in FIG. 3.

The charging profile PL1 is used when the ambient temperature TP of the power lines PL, NL is higher than T1 and equal to or less than T2 (T1<TP≤T2). The charging profile PL2 is used when the ambient temperature TP of the power lines PL, NL is higher than T2 and equal to or less than T3 (T2<TP≤T3). The charging profile PL3 is used when the ambient temperature TP of the power lines PL, NL is higher than T3 (T3<TP). The number of charging profiles is not limited to three, and can be set to any number of two or more.

The charging profile PL1 will be described as an example. Charging via the power lines PL, NL is permitted in a region on the lower left of the charging profile PL1 in the drawing. On the other hand, charging via the power lines PL, NL is prohibited in a region on the upper right of the charging profile PL1. Power transferred through the power lines PL, NL is controlled such that the state of the power lines PL, NL, which is represented by a coordinate (I, τ), does not intrude into the region on the upper right of the charging profile PL1. A similar description also applies to the remaining charging profiles PL2, PL3. It is understood from FIG. 3 that the degrees of reduction of the current I which flows through the power lines PL, NL and the energization time of the power lines PL, NL become larger (i.e. stricter limitation) in the order of the charging profiles PL1, PL2, and PL3.

The charging profile PL3 is positioned on the lower left of the charging profiles PL1, PL2, and has a small charging permitted area. This means that priority is given to the protection of the power lines PL, NL by enhancing power limitation (power reduction) during fast charging when the ambient temperature TP of the power lines PL, NL is high (T3<TP). On the contrary, the charging profile PL1 is positioned on the upper right of the charging profiles PL2, PL3, and has a large charging permitted area. This means that it is attempted to shorten the charging time by relaxing power limitation (power reduction) during fast charging when the ambient temperature TP of the power lines PL, NL is low (T1<TP≤T2). By selectively using the charging profiles PL1 to PL3 for fast charging of the vehicle 1 in accordance with the ambient temperature TP of the power lines PL, NL in this manner, it is possible to shorten the charging time by causing as much power as possible to flow through the power lines PL, NL while protecting the power lines PL, NL.

The inventor has focused on the fact that the actual temperature of the power lines PL, NL does not necessarily coincide with the ambient temperature TP (detection value of the ambient temperature sensor 5) of the power lines PL, NL, and tends to be high, when the battery 6 is charged repeatedly at short intervals. In the present embodiment, the charging profile to be used for fast charging of the vehicle 1 is switched in accordance with not only the ambient temperature TP of the power lines PL, NL but also whether the battery 6 is charged repeatedly at short intervals. Control for switching the charging profile will be described below.

Switching of Charging Profile

It can be determined whether the battery 6 is charged repeatedly at short intervals based on whether an elapsed time Δt since the last charging of the battery 6 was finished exceeds a reference time REF. The reference time REF may be determined based on various factors (such as the wire diameter φ of the power lines PL, NL), and is typically several tens of minutes to several hours.

In the following example, the reference time REF is determined as one hour. Currents I1, I2, and I3 are set to 200 A, 300 A, and 400 A, respectively. Energization times τ1, τ2, and τ3 are set to 100 seconds, 500 seconds, and 2000 seconds, respectively. It should be noted, however, these specific values are merely exemplary.

FIG. 4 illustrates a charging profile to be used when the elapsed time Δt since the last charging was finished is longer than the reference time REF. With reference to FIG. 4, when the elapsed time Δt since the last charging was finished is longer than the reference time REF, one of the charging profiles PL1 to PL3 that matches the ambient temperature TP of the power lines PL, NL is used.

It is assumed that the ambient temperature TP of the power lines PL, NL is higher than T2 and equal to or less than T3 in the example illustrated in FIG. 4. In this case, the charging profile PL2 corresponding to the ambient temperature TP is used. Then, energization with the current I3 is first performed for τ2. After that, energization with the current I2 (<I3) is performed for τ3 (>τ2).

While the charging profile PL2 is used in this example, the charging profile PL1 is occasionally used, and the charging profile PL3 is occasionally used, depending on the ambient temperature TP of the power lines PL, NL.

FIG. 5 illustrates a charging profile to be used when the elapsed time Δt since the last charging was finished is equal to or less than the reference time REF. With reference to FIG. 5, when the elapsed time Δt since the last charging was finished is equal to or less than the reference time REF, the charging profile PL3 with the strictest power limitation is used, irrespective of the ambient temperature TP of the power lines PL, NL.

In the case where the charging profile PL3 is used, energization with the current I3 is first performed for τ1. After that, energization with the current I2 (<I3) is performed for τ2 (>τ1). Finally, energization with the current I1 (<I2) is performed for τ3 (>τ2).

In this manner, in the present embodiment, when the elapsed time Δt since the last charging was finished is longer than the reference time REF (during normal times), a charging profile that matches the ambient temperature TP of the power lines PL, NL is used. Consequently, it is possible to keep the balance between the protection of the power lines PL, NL and the shortening of the charging time while permitting fast charging with as much power as possible.

When the elapsed time Δt since the last charging was finished is equal to or less than the reference time REF (when the battery 6 is charged repeatedly), on the other hand, priority is given to the protection of the power lines PL, NL, irrespective of whether the ambient temperature TP of the power lines PL, NL is high or low.

More particularly, the temperature of the power lines PL, NL is not directly measured in the present embodiment. This is intended to reduce the component cost, and based on the assumption that there is a correlation between the temperature in the compartment in which the power lines PL, NL are provided (the ambient temperature TP which is detected by the ambient temperature sensor 5) and the actual temperature of the power lines PL, NL and that the temperature of the power lines PL, NL can be estimated from the ambient temperature TP. However, the temperature of the power lines PL, NL is not necessarily reflected in the ambient temperature TP accurately. There is a possibility that the temperature of the power lines PL, NL is higher than the ambient temperature TP. In particular, such a possibility is high when the battery 6 is charged repeatedly at short intervals. Thus, when the battery 6 is charged repeatedly, the charging profile PL3 which is the most suitable for the protection of the power lines PL, NL is used, rather than selectively using a charging profile that matches the ambient temperature TP.

In the example illustrated in FIGS. 3 to 5, one or both of the charging profiles PL1, PL2 are an example of the "first profile" according to the present disclosure. The charging profile PL3 is an example of the "second profile" according to the present disclosure.

Control Flow

Figure 6:
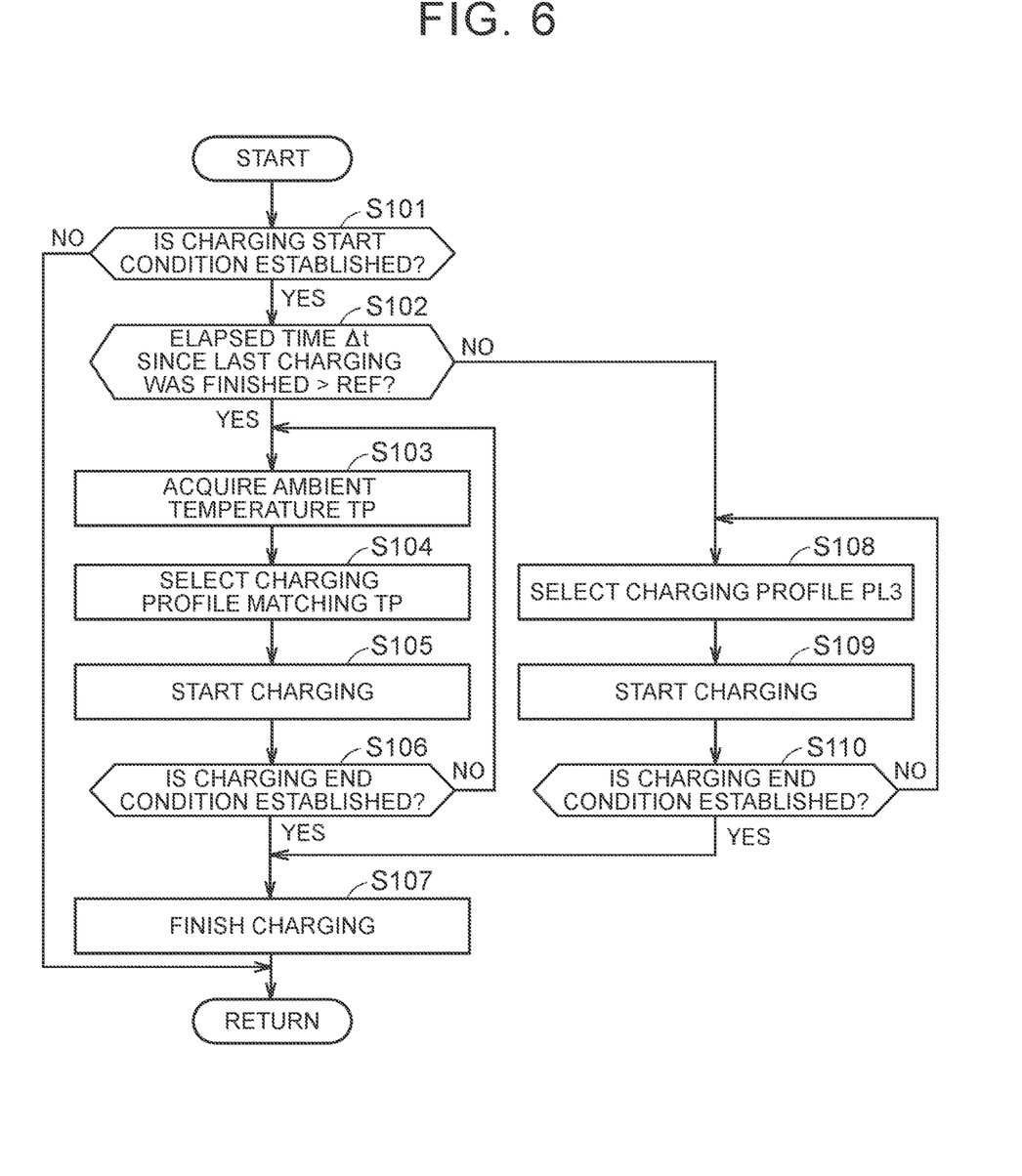
FIG. 6 is a flowchart illustrating fast charging of the vehicle according to a first embodiment.

FIG. 6 is a flowchart illustrating fast charging of the vehicle 1 according to the first embodiment. This flowchart (and the flowchart in FIG. 8 to be discussed later) may be invoked from a main routine (not illustrated) in computation cycles determined in advance, for example, to be executed. While the steps are implemented by software processing performed by the ECU 10, the steps may be implemented by hardware (an electric circuit) fabricated in the ECU 10. In the following description, the steps are abbreviated as "S".

With reference to FIG. 6, in step S101, the ECU 10 determines whether a start condition for fast charging of the vehicle 1 is established. The start condition for fast charging is established when the user connects the charging cable 8 to the inlet 2 and operates a start button (not illustrated) for fast charging (manual charging), for example. Alternatively, when timer charging is performed in accordance with a charging schedule determined in advance, the start condition for fast charging is established when the time to start timer charging arrives. The start condition for fast charging may be established based on the power supply-demand balance etc. in vehicle-grid integration (VGI). When the condition is not established (NO in S101), the process returns to the main routine.

When the start condition for fast charging is established (YES in S101), the ECU 10 determines whether the elapsed time Δt since the last charging of the battery 6 was finished is longer than the reference time REF (S102). Examples of the case where the elapsed time Δt since the last charging was finished is equal to or less than the reference time REF include a case where fast charging is stopped and resumed repeatedly based on user operations in manual charging. Other examples may include a case where fast charging is stopped and resumed repeatedly with the time difference between the charging end time and the charging start time being shorter than the reference time REF in timer charging.

Not only charging of the battery 6 during fast charging (manual charging or timer charging) of the vehicle 1 but also charging of the battery 6 during operation of the vehicle 1 may be taken into consideration. External charging is occasionally performed immediately after the user drives the vehicle 1 and comes back home. During operation of the vehicle 1, the battery 6 is charged (regenerative charging) and discharged repeatedly, and thus the PCU 72 operates intermittently, which may raise the temperature in the compartment. As a result, there may occur a deviation between the ambient temperature TP of the power lines PL, NL and the actual temperature of the power lines PL, NL. Thus, control for switching the charging profile illustrated in FIGS. 3 to 5 may be applied also when the elapsed time Δt since the last charging was finished is equal to or less than the reference time REF.

When the elapsed time Δt since the last charging was finished is longer than the reference time REF (YES in S102), the ECU 10 acquires the ambient temperature TP of the power lines PL, NL from the ambient temperature sensor 5 (S103). Further, the ECU 10 selects one of the plurality of charging profiles PL1 to PL3 that matches the ambient temperature TP (S104). Then, the ECU 10 starts fast charging of the vehicle 1 in accordance with the selected charging profile (S105). The method of charging using the charging profile is as described in relation to FIG. 4, for example.

In S106, the ECU 10 determines whether an end condition for fast charging is established. It is determined that the end condition for fast charging is established when a stop button (not illustrated) for fast charging is operated by the user or when it is the time to finish timer charging, for example. When the end condition for fast charging is not established (NO in S106), the ECU 10 returns to the process in S103. Consequently, the processes in S103 to S106 are repeatedly performed. When the end condition for fast charging is established (YES in S106), the ECU 10 proceeds to the process in S107, and finishes fast charging for the vehicle 1.

When the elapsed time Δt since the last charging of the battery 6 was finished is equal to or less than the reference time REF in S102 (NO in S102), on the other hand, the ECU 10 proceeds to the process in S108, and selects the charging profile PL3 with the strictest power limitation. Further, the ECU 10 starts fast charging of the vehicle 1 using the charging profile PL3 (S109). After that, the ECU 10 continues fast charging using the charging profile PL3 (NO in S110) until the end condition for fast charging is established. When the end condition for fast charging is established (YES in S110), fast charging of the vehicle 1 is finished (S107).

In the first embodiment, as described above, the charging profile PL3 is used uniformly (S108), irrespective of the ambient temperature TP, when the battery 6 is charged repeatedly at relatively short intervals. When the battery 6 is charged repeatedly, it is possible that the temperature of the power lines PL, NL has become high. Thus, with the first embodiment, the power lines PL, NL can be protected more reliably, even if there occurs a deviation between the ambient temperature TP (a detection value of the ambient temperature sensor 5) and the actual temperature of the power lines PL, NL, by using the charging profile PL3 which is set to be the safest.

A configuration in which a dedicated temperature sensor (not illustrated) for monitoring the temperature of the power lines PL, NL is provided is not excluded, although such a configuration may increase the component cost. The power lines PL, NL can be protected further reliably by executing the series of processes indicated in FIG. 6 when a temperature sensor dedicated to the power lines PL, NL is provided. In this manner, a configuration in which the temperature of the power lines PL, NL is estimated using the ambient temperature sensor 5 without providing a temperature sensor dedicated to the power lines PL, NL is not essential to the present disclosure.

Second Embodiment

In the first embodiment, fast charging of the vehicle 1 is performed. In a second embodiment, external power supply from the vehicle 1 to the outside is performed.

Power systems that depend on large-scale power plants owned by power companies have been taken into reconsideration in recent years, in particular, and schemes for making use of energy resources (hereinafter also referred to as "demand side resources" (DSR)) owned by customers for the power systems are being constructed. A virtual power plant (VPP) is proposed as a scheme for making use of the DSRs for the power systems. The VPP is a scheme for causing a large number of DSRs to function as if the DSRs were a single power plant through remote and integrated control using an advanced energy management technology that makes use of the Internet of Things (IoT).

Figure 7:
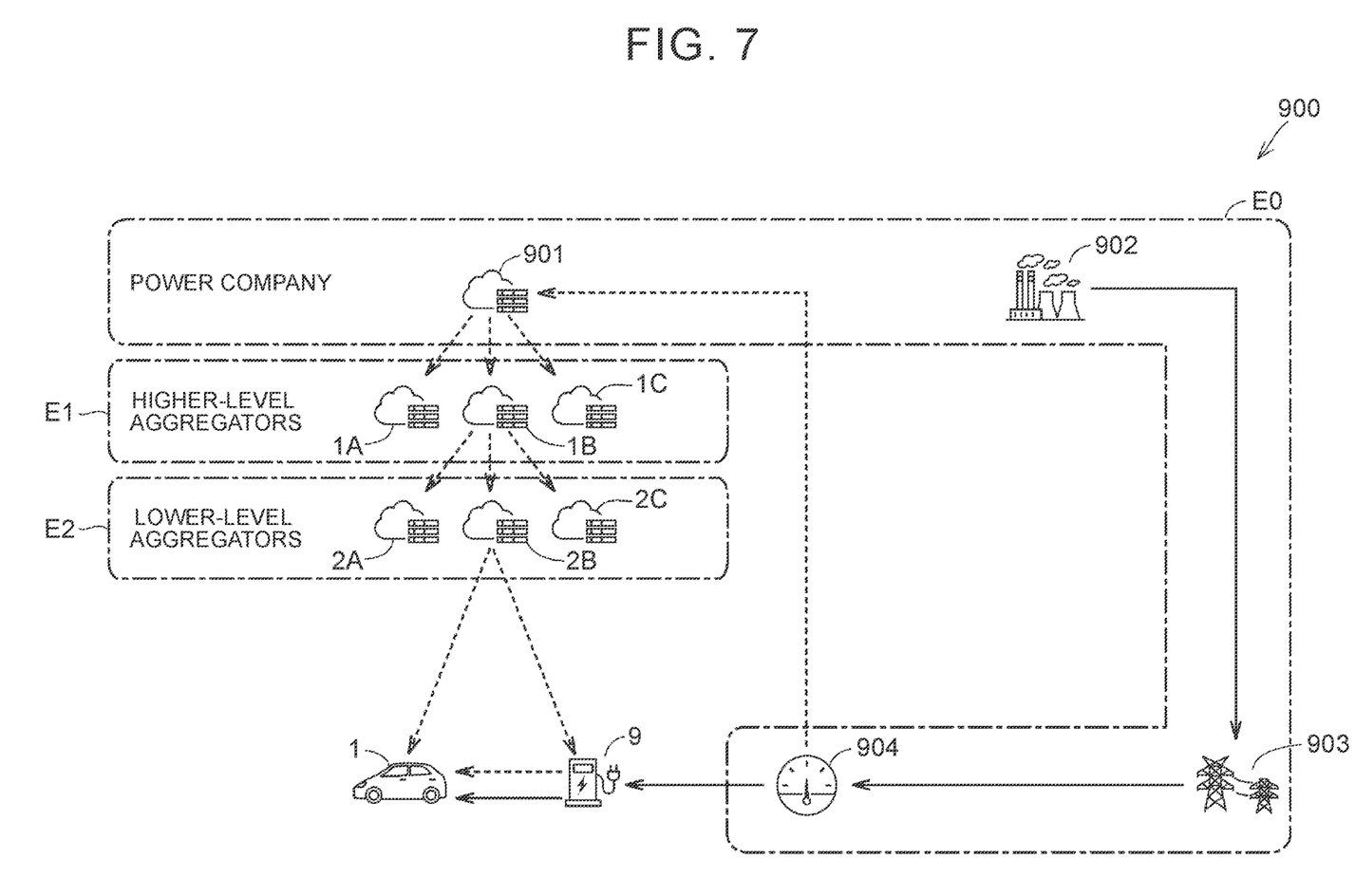
FIG. 7 illustrates an overall configuration of a power system according to a second embodiment.

FIG. 7 illustrates an overall configuration of a power system according to the second embodiment. With reference to FIG. 7, a power system 900 includes a power company E0, a plurality of higher-level aggregators E1, and a plurality of lower-level aggregators E2. The aggregators mean business operators that provide an energy management service in the VPP.

The power company E0 generates and supplies power. The power company E0 includes a server 901, a power plant 902, power transmission/distribution facilities 903, and a smart meter 904.

The server 901 manages information on the higher-level aggregators E1 under control thereof. The power plant 902 includes a power generation device that generates electricity, and is configured to supply power generated by the power generation device to the power transmission/distribution facilities 903. The power transmission/distribution facilities 903 include power transmission lines, power substations, and power distribution lines, and are configured to transmit and distribute power supplied from the power plant 902. The power plant 902 and the power transmission/distribution facilities 903 construct a power system (power network). The smart meter 904 is configured to measure the amount of power used each time a predetermined time elapses, and store and transmit to the server 901 the measured amount of power used. The charging apparatus 9 is connected to the power system of the power company E0 via the smart meter 904.

Each of the higher-level aggregators E1 manages a plurality of lower-level aggregators E2. Each of the higher-level aggregators E1 includes a plurality of servers 1A to 1C, that is, each higher-level aggregator E1 includes a plurality of severs 1A to 1C. Each of the lower-level aggregators E2 is provided with a plurality of severs 2A to 2C, that is, each lower-level aggregator E2 includes a plurality of servers 2A to 2C. Each of the servers 2A to 2C controls the amount of power exchanged with each of the customers.

The power company E0, the higher-level aggregators E1, and the lower-level aggregators E2 can vary the power demand pattern by adjusting the power supply-demand balance using a scheme called "demand response" (DR).

More particularly, the server 901 transmits a signal requesting participation in the DR (DR participation request) to each of the higher-level aggregators E1. In the example illustrated in FIG. 7, when the DR participation request is received, the server 1B calculates an adjustable power amount (possible DR amount) in accordance with the DR, and transmits the possible DR amount to the server 901. For example, the server 1B can acquire the possible DR amount of each lower-level aggregator E2 by inquiring of the servers 2A to 2C which are provided in the lower-level aggregator E2. The server 901 determines the amount of power adjustment to be asked of each higher-level aggregator E1 based on the possible DR amount which is received from each of the servers 1A to 1C included in the higher-level aggregator E1, and transmits a signal (first DR execution instruction) instructing execution of the DR to the higher-level aggregator E1.

When the inquiry discussed earlier is received from the server 1B, the server 2B of the lower-level aggregator E2 calculates a DR capacity of the lower-level aggregator E2 corresponding to the server 2B based on information about the vehicle 1 and the charging apparatus 9, and transmits the DR capacity to the server 1B. When the first DR execution instruction is received from the server 901, the server 1B determines the amount of power adjustment to be asked of each lower-level aggregator E2 based on the DR capacity which is received from each of the servers 2A to 2C included in the lower-level aggregator E2, and transmits a signal (second DR execution instruction) instructing execution of the DR to the lower-level aggregator E2.

The configuration of the vehicle 1 and the charging apparatus 9 is similar to the configuration described in relation to the first embodiment (see FIG. 2). When power is supplied from the vehicle 1 to the outside, discharging profiles are used in place of the charging profiles. An example in which three discharging profiles PL1 to PL3 are used will be described also in relation to the second embodiment, as with the first embodiment. The characteristics of the discharging profiles PL1 to PL3 are equivalent to the characteristics of the charging profiles PL1 to PL3 (see FIGS. 3 to 5), in spite of the difference between charging and discharging, and therefore a detailed description will not be repeated.

Figure 8:
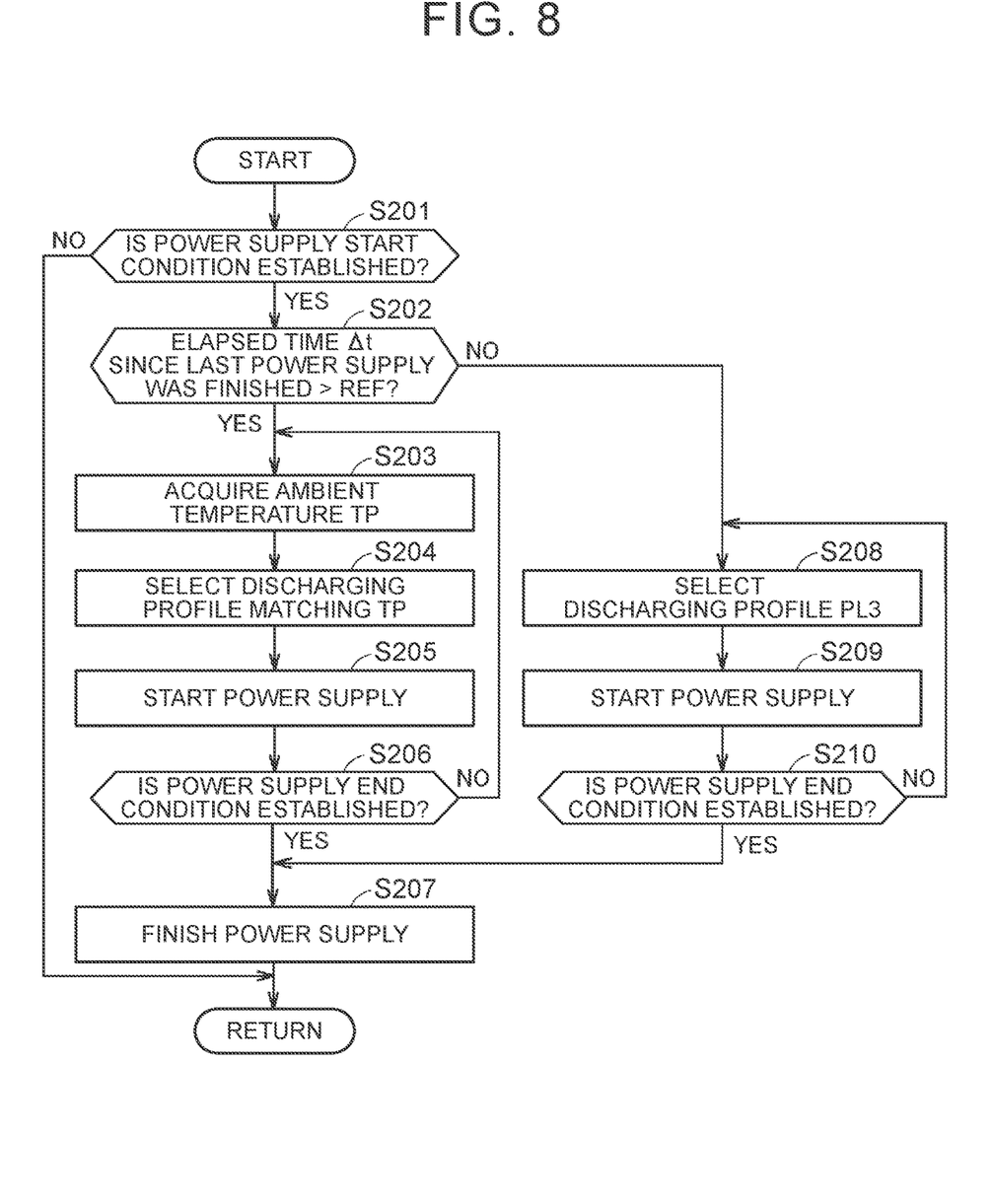
FIG. 8 is a flowchart illustrating external power supply from a vehicle according to the second embodiment.

FIG. 8 is a flowchart illustrating external power supply from the vehicle 1 according to the second embodiment. With reference to FIG. 8, in step S201, the ECU 10 determines whether a start condition for external power supply from the vehicle 1 is established. The start condition for external power supply is established when the user connects the charging cable 8 to the inlet 2 and operates a start button (not illustrated) for external power supply, for example. Alternatively, the start condition for external power supply may be established based on the power supply-demand balance (more specifically, an instruction from the server 2B illustrated in FIG. 7). When the start condition for external power supply is not established (NO in S201), the process returns to the main routine.

When the start condition for external power supply is established (YES in S201), the ECU 10 determines whether the elapsed time Δt since the last external power supply was finished is longer than the reference time REF (S202). The value of the reference time REF may be different from that of the reference time REF according to the first embodiment.

When the elapsed time Δt since the last power supply was finished is longer than the reference time REF (YES in S202), the ECU 10 acquires the ambient temperature TP of the power lines PL, NL from the ambient temperature sensor 5 (S203).

The ECU 10 may estimate the ambient temperature TP of the power lines PL, NL based on a travel history of the vehicle 1. For example, by calculating experimentally the relationship among the magnitude of power charged into and discharged from the battery 6 during travel of the vehicle 1, the time for which the battery 6 is charged and discharged, the outside air temperature, and the ambient temperature TP of the power lines PL, NL, the ambient temperature TP can be estimated from the three remaining parameters.

In S204, the ECU 10 selects one of the plurality of discharging profiles PL1 to PL3 that matches the ambient temperature TP. Then, the ECU 10 starts external power supply from the vehicle 1 in accordance with the selected discharging profile (S205).

In S206, the ECU 10 determines whether an end condition for external power supply is established. It is determined that the end condition for external power supply is established when a stop button (not illustrated) for external power supply is operated by the user, for example. Alternatively, the end condition for external power supply may be established based on the power supply-demand balance. When the end condition for external power supply is not established (NO in S206), the processes in S203 to S206 are executed repeatedly. When the end condition for external power supply is established (YES in S206), external power supply from the vehicle 1 is finished (S207).

When the elapsed time Δt since the last power supply was finished is equal to or less than the reference time REF in S202 (NO in S202), on the other hand, the ECU 10 selects the discharging profile PL3 with the strictest power limitation (S208). Further, the ECU 10 starts external power supply from the vehicle 1 using the discharging profile PL3 (S209). After that, the ECU 10 continues external power supply using the discharging profile PL3 (NO in S210) until the end condition for external power supply is established. When the end condition for external power supply is established (YES in S210), external power supply from the vehicle 1 is finished (S207).

In the second embodiment, as described above, the discharging profile PL3 is used uniformly (S208), irrespective of the ambient temperature TP, when the battery 6 is discharged repeatedly at relatively short intervals (e.g. one hour or less). That is, when the battery 6 is discharged repeatedly, the discharging profile PL3 which is set to be the safest is used in consideration of the possibility that the temperature of the power lines PL, NL has become high. Consequently, the power lines PL, NL can be protected more reliably even if there occurs a deviation between the ambient temperature TP and the actual temperature of the power lines PL, NL.

An example in which the battery 6 is charged along with fast charging of the vehicle 1 has been described in relation to the first embodiment, and an example in which the battery 6 is discharged along with external power supply from the vehicle 1 has been described in relation to the second embodiment. However, Joule heat is generated in the power lines PL, NL irrespective of whether the battery 6 is charged or discharged, and thus it is not necessary to differentiate whether the battery 6 is charged or discharged when selecting the charging profile or the discharging profile to be used. An appropriate charging or discharging profile may be selected based on past charging and discharging histories (both a charging history and a discharging history) of the battery 6.

Contact charging (contact discharging) in which power is transmitted to or received from the outside (power system 900) via a charging cable has been described in relation to the first and second embodiments. However, power may be exchanged with an external apparatus in a non-contact manner. For example, processes that are similar to the processes (see FIG. 6) described in relation to the first embodiment are also applicable to a case where non-contact charging in which power is transferred in a non-contact manner from a power transmission device embedded in the ground to a power reception device mounted on a vehicle is performed. In that case, the power reception device is an example of the "power interface" according to the present disclosure.

The embodiments disclosed herein should be considered as exemplary in all respects and not limiting. The scope of the present disclosure is defined by the claims, rather than the description of the embodiments made above, and intended to include all changes that fall within the meaning and scope of the claims and equivalents thereof

What is claimed is:

1. A vehicle comprising:
a power interface configured to perform at least one of power transmission to and power reception from an external apparatus;
a power accumulation device;
a power line that constitutes at least a part of a current path between the power interface and the power accumulation device; and
a control device configured to control charging and discharging of the power accumulation device using a plurality of profiles for protecting the power line, wherein:
the profiles are determined such that degrees of reduction of a magnitude of a current that flows through the power line and an energization time become larger as an ambient temperature of the power line becomes higher;
the profiles include a first profile and a second profile that has a degree of reduction larger than a degree of reduction of the first profile; and
the control device is configured to calculate, before charging and discharging of the power accumulation device, an elapsed time since last charging and discharging of the power accumulation device, control charging and discharging of the power accumulation device using one of the first and second profiles that matches the ambient temperature when the elapsed time is longer than a reference time, and control charging and discharging of the power accumulation device using the second profile, irrespective of the ambient temperature, when the elapsed time is shorter than the reference time.

2. The vehicle according to claim 1, wherein the second profile has the degree of reduction that is the largest among the degrees of reduction of the profiles.

3. The vehicle according to claim 1, wherein:
a temperature sensor configured to detect a temperature of the power line is not provided;
the power line is disposed in a compartment; and
the vehicle further comprises a temperature sensor configured to detect a temperature in the compartment as the ambient temperature.

4. The vehicle according to claim 3, further comprising a power conversion device that performs power conversion operation between the power interface and the power accumulation device, wherein:
the power conversion device is disposed in the same compartment as the power line; and
the temperature sensor is configured to detect an environmental temperature of the power conversion device as the ambient temperature.

5. The vehicle according to claim 3, further comprising a power drive device disposed in the compartment to control travel of the vehicle, wherein the control device is configured to estimate the ambient temperature based on a travel history of the vehicle.

6. The vehicle according to claim 1, wherein the control device is configured to calculate the elapsed time based on at least one of a time that has elapsed since last external charging of the power accumulation device and a time that has elapsed since travel of the vehicle was finished.

7. The vehicle according to claim 1, wherein the control device is configured to calculate the elapsed time based on at least one of a time that has elapsed since last external power supply from the power accumulation device and a time that has elapsed since travel of the vehicle was finished.

8. A control method for a vehicle, the vehicle including a power interface configured to perform at least one of power transmission to and power reception from an external apparatus, a power accumulation device, and a power line that constitutes at least a part of a current path between the power interface and the power accumulation device, the control method comprising:
acquiring an ambient temperature of the power line; and
controlling charging and discharging of the power accumulation device using a plurality of profiles for protecting the power line, wherein:
the profiles are determined such that degrees of reduction of a magnitude of a current that flows through the power line and an energization time become larger as an ambient temperature of the power line becomes higher;
the profiles include a first profile and a second profile that has a degree of reduction larger than a degree of reduction of the first profile; and
the controlling includes calculating, before charging and discharging of the power accumulation device, an elapsed time since last charging and discharging of the power accumulation device, controlling charging and discharging of the power accumulation device using one of the first and second profiles that matches the ambient temperature when the elapsed time is longer than a reference time, and controlling charging and discharging of the power accumulation device using the second profile, irrespective of the ambient temperature, when the elapsed time is shorter than the reference time.

* * * * *